April 3, 1951 R. H. YOUNG ET AL 2,547,240
FISHING LURE
Filed March 15, 1947

INVENTORS
R. HARRISON YOUNG
ISABELLE R. FERGUSON
BY
*B. Schlesinger*
ATTORNEY

Patented Apr. 3, 1951

2,547,240

UNITED STATES PATENT OFFICE 2,547,240

FISHING LURE

Richard Harrison Young and Isabelle R. Ferguson, Rochester, N. Y., assignors to Flectolite, Rochester, N. Y., a firm composed of said Young, said Ferguson, and Bruce L. Bradley Application March 15, 1947, Serial No. 734,994

3 Claims. (Cl. 43—42.32)

The present invention relates to fishing lures, to their manufacture, and particularly to fishing spoons and to a method of manufacturing the same.

One object of this invention is to provide a fishing spoon which will reflect light over a wide area and thereby attract any fish swimming within that area.

Another object of the invention is to provide a fishing spoon which will not only reflect light specularly but will also diffuse the light with the result that the fishing spoon will glow and glitter, and thereby arouse the interest of any fish swimming within range of vision of the spoon.

A further object of the invention is to provide a simple, inexpensive method of manufacturing a fishing spoon of the character described.

Other objects of the invention will be apparent hereinafter from the specification and from the recital of the appended claims.

Figure 4:
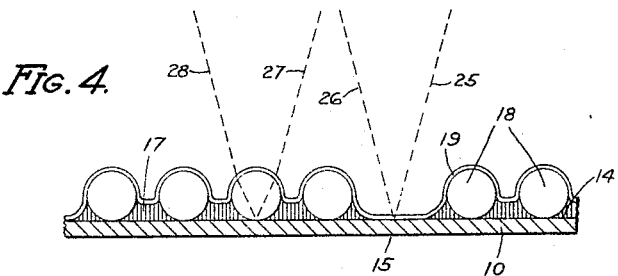
Figure 5:
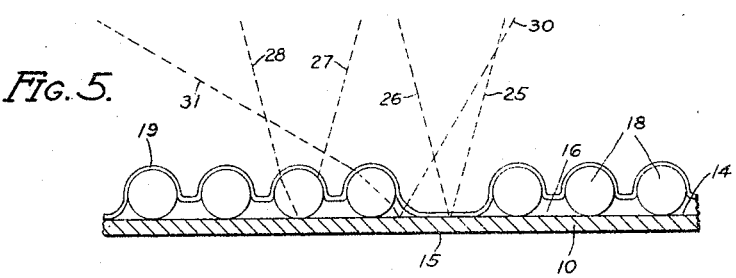

Fig. 4 is a corresponding sectional view of a spoon manufactured according to one embodiment of this invention in its final form and illustrating diagrammatically how this spoon reflects the light; and Fig. 5 is a similar sectional view showing a spoon manufactured according to another embodiment of the invention in its final form, and illustrating diagrammatically how this latter spoon reflects the light.

A fishing spoon made according to this invention has a body or base, one side at least of which is polished or silvered to provide a mirror-like reflecting surface or to one side of which a reflecting surface is adhered. In manufacturing the spoon, the reflecting surface is sprayed with a lacquer or other suitable binding material, which may be either pigmented or transparent, and, before the binding material has had a chance to set, transparent glass beads are distributed over its surface. The layer of binding material is preferably a very thin layer, with the result that the beads sink of their own weight through the binding material to contact the reflecting surface of the base of the spoon, and with the further result that, due to capillary attraction, the beads will pull the lacquer away from parts of the reflecting surface. After the binding material has set adhering the beads to the base of the spoon, a second coat of preferably transparent lacquer is sprayed over the beads and over the first coat to further strengthen the bond. When a fishing spoon is constructed in this way, rays of light falling on the portions of the reflecting surface of the spoon, from which the lacquer has been pulled away, will be spectrally reflected; and rays of light passing through the beads will be diffused. If the first binding coating is pigmented, this coating will have in itself a definite reflective property. If the first binding coating is clear, the rays of light passing through this binding coat close to a bead will be reflected from the mirror-like surface through the bead and will be diffused differently from rays of light which pass directly through a bead. This will cause the spoon to glow or glitter. Thus, a spoon may be provided by this invention which will very definitely attract fish.

Referring now to the drawings by numerals of reference, 10 indicates the metallic base or body portion of the spoon. To one end of this spoon there is secured the usual multi-pronged hook 11, and to the other end there may be secured a conventional coupling member 12 to which the leader of the fishing line may be connected.

Figure 1:
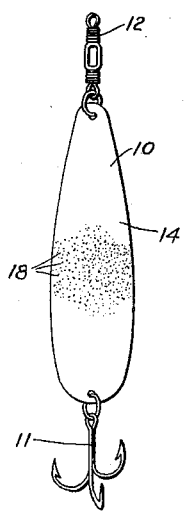
Fig. 1 is a side elevation of a fishing spoon made according to one embodiment of this invention.
Figure 2:
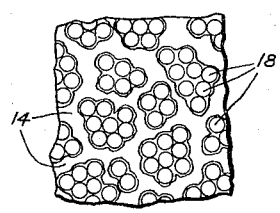
Fig. 2 is a fragmentary elevational view on a greatly enlarged scale, showing the surface at one side of the spoon at one stage of manufacture of the spoon.
Figure 3:
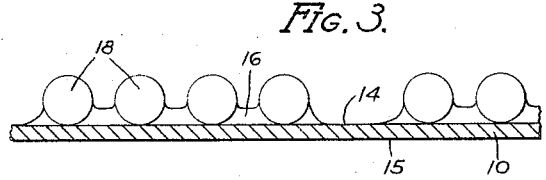
Fig. 3 is a sectional view, at right angles to Fig. 2, on a still further enlarged scale, and showing the spoon at this same stage of manufacture.

Both sides 14 and 15 of the body portion 10 of the spoon are preferably highly polished to provide silvery mirror-like reflecting surfaces. One side 15 may be left smooth. To the other side 14 there is applied a very thin coat of lacquer or other suitable binding material. The thickness of this coat may be approximately .0025 inch. This coat may be of clear lacquer as denoted at 16 in Figs. 3 and 5, or it may be of colored lacquer as indicated at 17 in Fig. 4.

The lacquer is allowed to stand for approximately a minute and a quarter, and before it can dry or set, a plurality of glass beads 18 are scattered over its surface. These beads may be of any suitable size. It has been found that beads, which will pass through a .008 to .010 inch mesh screen, suit the purpose very well.

No effort is made to space these beads uniformly over the surface of the binding material, and it has been found that they tend to group themselves together in groups of varying numbers of beads, as illustrated in the drawing. It has been found, also, that due to the thinness of the coat 16 or 17 of lacquer, the beads sink through the coating to contact the surface 14 and that, moreover, the beads tend by capillary attraction to draw the coating away from parts of the surface 14, stripping and exposing that surface. Thus, parts of the surface 14 of the spoon will be covered by an increased thickness of coating 16 or 17, and by the beads 18, while other parts of this surface 14 will be left exposed.

The tendency of the beads to group themselves together will be increased if, as is preferable, the beads are applied to the lacquered surface by dropping them through a screen of a mesh but slightly larger than the diameter of the beads themselves. The contact of the beads with the wires defining the meshes of the screen seems to increase the charge of static electricity in the beads and increase their attraction for one another after they have fallen on the sprayed surface of the spoon.

After the beads have become set in the binding coating 16 or 17, and this coating has become dry, a second coating 19 of clear lacquer is sprayed over the beads and over the first coating and over the whole surface 14 of the spoon. This is to insure firm bonding of the beads to the base or body of the spoon. This second coating is preferably of clear lacquer and may be approximately .002 inch in thickness.

When the spoon is in the water, light falling upon its beaded surface is reflected in various ways. Light, which strikes the spoon at a portion of the surface 14, which is not covered by the first bonding coating, will pass through the clear coating 19 and be reflected spectrally from this mirror-like surface. Thus, a light ray 25 falling angularly upon the spoon 10 will be reflected along the line 26, with the angle of incidence equal to the angle of reflection. On the other hand, a light ray 27, passing through the clear outer lacquer coating 19 and striking one of the beads 18 will pass through the bead and strike the surface 14, and will be reflected and refracted along some line such as the line 28, causing diffusion of the light. Thus, in the same spoon there will be both specular and diffused reflection, which will give to the spoon a glowing surface. If the first bonding coating is pigmented, as indicated at 17 in Fig. 4, this coating will have in itself a definite reflective property which adds to the appearance and attractiveness of the spoon. If the first coating 16 of lacquer or binding material is clear, there will be rays of light, such as the ray 30 (Fig. 5) which will pass through the two coatings 19 and 16 and strike the mirror surface 14 and be reflected therefrom, and then be refracted through the adjacent bead 18, passing out of the outer coating 19 along some line such as the line 31. Thus further diffusion of the light will be obtained. This adds a glitter to the spoon. The wide-angle rays 28 and 31 will be visible to fish over a considerable area. They do not have the penetrating power or distance projection of rays which are concentrated in a small cone, that is, reflected at a small angle, but the glitter or glow that they produce, has proven especially attractive to fish; and fish are proverbially near-sighted anyway.

Where the initial coating is colored, such as the coating 17 of Fig. 4, any suitable color may be employed, preferably however a bright color such as red or yellow. Mixed colors may also be used, part of the surface being colored red, for instance, and another part yellow.

It will be seen from the above description that there has been provided by the present invention a very attractive form of spoon, capable of interesting a fish within a wide range, and which can be made at a relatively low cost.

While the invention has been described in connection with particular embodiments thereof, it will be understood that it is capable of various further modifications and uses, and that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A fishing lure comprising a metallic body portion which has a polished metallic reflecting surface at one side, a layer of transparent beads superimposed on said surface and directly contacting the reflecting surface, and a binder in which said beads are embedded for adhering the beads to said surface, said beads being arranged in spaced clusters over the reflecting surface.

2. A fishing lure comprising a metallic body portion which has a polished metallic reflecting surface at one side, a binder coating which covers part of said surface only leaving other parts of the surface uncovered, a plurality of transparent beads which contact said surface and are irregularly spread over said surface and arranged in spaced clusters over said surface and which are partially embedded in said binder coating, and a second binder coating covering both the beads and the surface, the second coating being transparent.

3. A fishing lure comprising a metallic body portion which has a polished metallic reflecting surface at one side, a plurality of transparent beads which are in contact with said reflecting surface and which are irregularly spread over said surface and arranged in spaced clusters thereon, a transparent bonding material for adhering said beads to said surface, said bonding material covering part of the surface only and leaving other parts exposed, and a second transparent bonding coating covering the beads and said surface.

R. HARRISON YOUNG.
ISABELLE R. FERGUSON.

REFERENCES CITED

The following references are of record in the file of this patent:

UNITED STATES PATENTS

| Number | Name | Date |
| --- | --- | --- |
| 468,361 | Pflueger | Feb. 9, 1892 |
| 823,445 | Schramm | June 12, 1906 |
| 1,626,508 | Carlson | Apr. 26, 1927 |
| 1,750,604 | Pflueger | Mar. 11, 1930 |
| 2,124,152 | Salm | July 19, 1938 |
| 2,143,946 | Hunter | Jan. 17, 1939 |
| 2,213,701 | Haselwood | Sept. 3, 1940 |
| 2,294,930 | Palmquist | Sept. 8, 1942 |
| 2,326,634 | Gebhard et al. | Aug. 10, 1943 |
| 2,354,048 | Palmquist | July 18, 1944 |
| 2,378,252 | Staehle et al. | June 12, 1945 |

OTHER REFERENCES

Heddon Catalog 1937, Page 18, upper left corner of Color Chart, Lure defined "O Green Crackle Back." Published by James Heddon's Sons, Dowagiac, Michigan. Copyright 1937.